(12) United States Patent
Chang

(10) Patent No.: US 12,568,396 B2
(45) Date of Patent: Mar. 3, 2026

(54) TRANSMISSION METHOD AND BASEBAND UNIT FOR 5G NETWORK SYSTEM

(71) Applicant: HTC Corporation, Taoyuan City (TW)

(72) Inventor: Heng-Che Chang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 217 days.

(21) Appl. No.: 18/544,450

(22) Filed: Dec. 19, 2023

(65) Prior Publication Data

US 2025/0203454 A1      Jun. 19, 2025

(51) Int. Cl.
*H04W 28/06*            (2009.01)
(52) U.S. Cl.
CPC ......... *H04W 28/06* (2013.01); *H04L 2212/00* (2013.01)
(58) Field of Classification Search
CPC ............................ H04W 28/06; H04L 2212/00
See application file for complete search history.

(56) References Cited

U.S. PATENT DOCUMENTS

| | | | | |
|---|---|---|---|---|
| 10,419,354 B2 * | 9/2019 | Li | ...................... | H04W 28/0273 |
| 10,560,382 B2 * | 2/2020 | Li | ........................... | H04L 69/24 |
| 10,601,721 B2 | 3/2020 | Goel | | |
| 11,601,447 B1 * | 3/2023 | Nelson | ................. | H04W 12/128 |
| 2006/0221952 A1 * | 10/2006 | Basso | ................... | H04L 1/0052 |
| | | | | 370/389 |

| | | | | |
|---|---|---|---|---|
| 2011/0314274 A1 * | 12/2011 | Swartz | ................ | H04L 63/0428 |
| | | | | 713/160 |
| 2024/0015833 A1 * | 1/2024 | Irlanki | .................. | H04W 76/20 |
| 2025/0031090 A1 * | 1/2025 | Tonesi | ................ | H04L 47/2475 |

FOREIGN PATENT DOCUMENTS

| | | | | | |
|---|---|---|---|---|---|
| CN | 103079232 A | * | 5/2013 | | |
| CN | 111245702 A | * | 6/2020 | ............. | H04W 80/10 |
| CN | 110167197 B | * | 1/2021 | ........... | H04L 67/568 |
| CN | 114039933 A | | 2/2022 | | |
| CN | 114390121 A | * | 4/2022 | ............. | H04W 28/06 |
| CN | 116055582 A | | 5/2023 | | |
| JP | 4602568 B2 | * | 12/2010 | ............. | H04L 65/65 |

OTHER PUBLICATIONS

Search Report mailed/issued on Jun. 3, 2024 for EP application No. 23218315.2, pp. 1-5. ,Jun. 3, 2024.
Office action mailed on May 20, 2024 for the Taiwan application No. 112149378, filing date Dec. 19, 2023, p. 1-4, May 20, 2024.

* cited by examiner

*Primary Examiner* — Oanh Duong
(74) *Attorney, Agent, or Firm* — Winston Hsu

(57)      ABSTRACT
A transmission method for a baseband unit (BBU) of a 5G network system includes determining, by a user-plane program, a modified maximum segment size (MSS) value of transmission control protocol (TCP) connection for the BBU of the 5G network system; and modifying, by the user-plane program, an original MSS value with the modified MSS value for encapsulation during a TCP three-way handshake procedure; wherein the modified MSS value is related to a packet length of an application packet between the UE and an application (APP) server of the 5G network system.

10 Claims, 4 Drawing Sheets

TRANSMISSION METHOD AND BASEBAND UNIT FOR 5G NETWORK SYSTEM

BACKGROUND OF THE INVENTION

1. Field of the Invention

The present invention relates to a transmission method and baseband unit for 5G network system, and more particularly, to a transmission method and baseband unit for 5G network system capable of avoiding Internet Protocol (IP) fragmentation problem.

2. Description of the Prior Art

To exchange application packets between the 5G core (5GC) network and the baseband unit (BBU), application packets are encapsulated with the GTP header and the UDP header, which might lead to the packet length of the GTP encapsulated application packets are bigger than the MTU of nodes between 5GC and BBU. Maximum transmission unit (MTU) denotes the maximum length for a single IP packet that is going to be sent out. If the Internet Protocol (IP) length of a packet is larger than the MTU, the packet is broken into multiple smaller packets to qualify the MTU, i.e. IP fragmentation.

Once a packet is fragmented from the transmitter, the fragmented packets are defragmented at the receiver side, which affects the system performance. Therefore, improvements are necessary to the conventional technique.

SUMMARY OF THE INVENTION

The present invention therefore provides a transmission method and baseband unit for the 5G network system to solve the abovementioned problem.

An embodiment of the present disclosure discloses a transmission method for a baseband unit (BBU) of a 5G network system, comprises determining, by a user-plane program, a modified maximum segment size (MSS) value of transmission control protocol (TCP) connection for the BBU of the 5G network system; and modifying, by the user-plane program, an original MSS value with the modified MSS value for encapsulation during a TCP three-way handshake procedure; wherein the modified MSS value is related to a packet length of an application packet between the UE and an application (APP) server of the 5G network system.

Another embodiment of the present disclosure discloses a baseband unit (BBU) for a 5G network system, wherein the 5G network system includes a user equipment and an application (APP) server, and the BBU comprises a distribution unit (DU); a central unit (CU); a Linux kernel framework Netfilter, configured to receive an application packet from the UE or the APP server; and a user-plane program, configured to receive the application packet from the Linux kernel framework Netfilter to determine a modified maximum segment size (MSS) value of transmission control protocol (TCP) for the BBU, and to modify an original MSS value with the modified MSS value for encapsulation during a TCP three-way handshake protocol; wherein the modified MSS value is related to a packet length of the application packet between the UE and the APP server of the 5G network system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
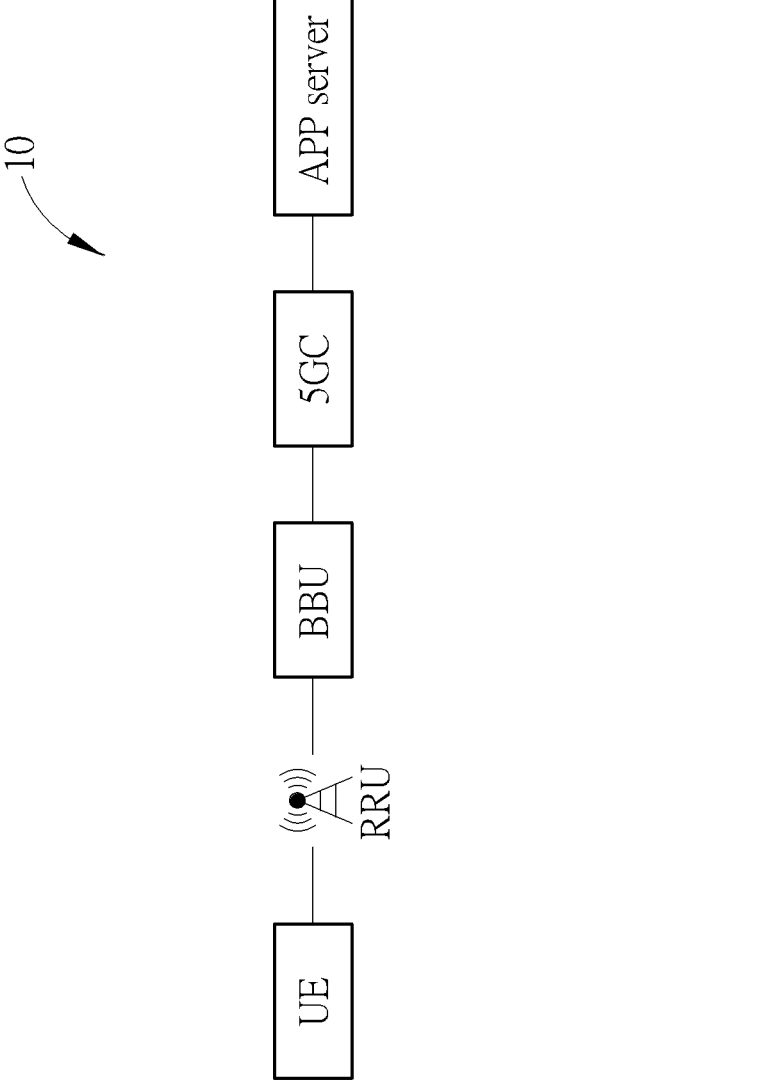
FIG. 1 is a schematic diagram of a communication system according to an embodiment of the present invention.

Please refer to FIG. 1, which is a schematic diagram of a communication system 10 according to an embodiment of the present invention. The communication system 10 may be a 5G network system, which includes a user equipment UE, a remote radio unit RRU, a baseband unit BBU, a 5G core (5GC) network and an application (APP) server, wherein the UE may be a 5G access point (AP) application.

Figure 2:
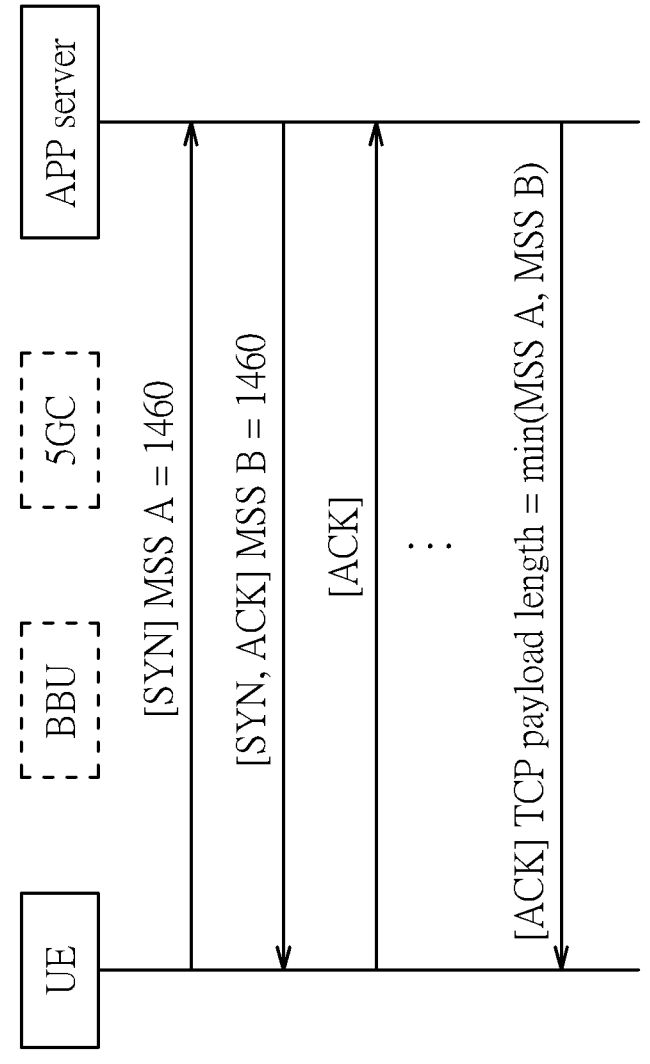
FIG. 2 is a timing diagram of a transmission control protocol three-way handshake of a 5G network system according to an embodiment of the present invention.

Please refer to FIG. 2, which is a timing diagram of a transmission control protocol (TCP) three-way handshake of the 5G network system according to an embodiment of the present invention. Before exchanging application packets between the 5GC network and the BBU of the 5G network system, a maximum segment size (MSS) value of TCP for the BBU of the 5G network system is determined, wherein the MSS value limits TCP segment size for a transmitter/receiver of the 5G network system.

The MSS value is related to a maximum transmission unit (MTU) size of each node of the 5G network system. In an embodiment, the MTU size for the transport layer of TCP/IP of each node is 1500 bytes. If an encapsulated packet length is larger than 1500 bytes, the encapsulated packet will be broken down into smaller packets for transmission, which leads to Internet protocol (IP) fragmentation/defragmentation and affects the throughput.

As shown in FIG. 2, the TCP three-way handshake is performed between the UE and the APP server for determining the MSS value. In an example, the UE sends a [SYN] message including an MSS value A of 1460 bytes to the APP server, and the APP server sends a [SYN, ACK] message including an MSS value B of 1460 bytes to the UE. After the APP server receives an ACK message from the UE, a TCP payload length is determined according to a minimum value of the MSS value A and the MSS value B for MSS clamping. In this example, the MSS value is determined as 1460 bytes for both of the UE and the APP server.

In order to avoid IP fragmentation/defragmentation, the baseband unit BBU according to an embodiment of the present invention adjusts the MSS value of the TCP three-way handshake packet with GTP header to limit a length of the application packet.

Figure 3:
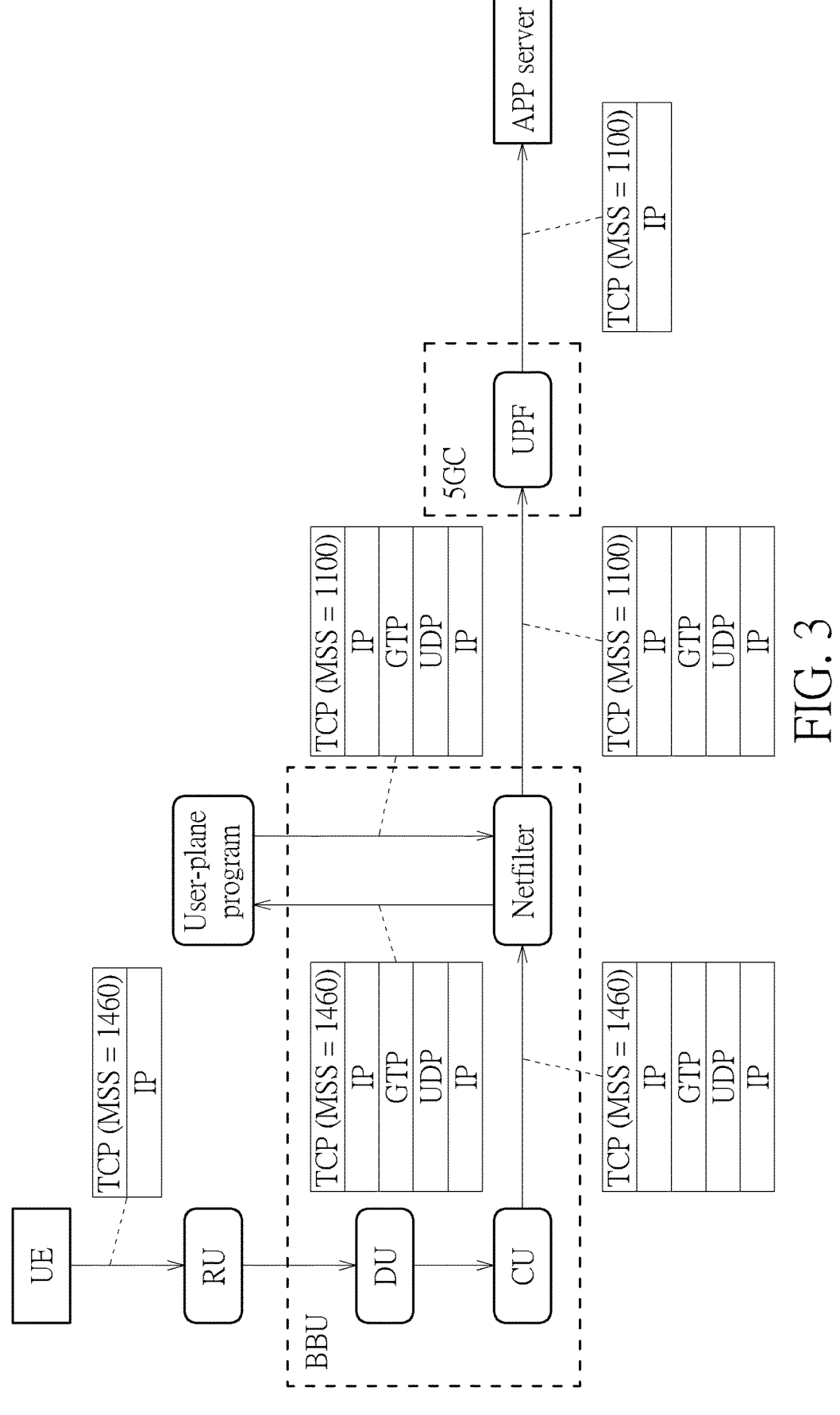
FIG. 3 is a schematic diagram of the communication system according to an embodiment of the present invention.

Please refer to FIG. 3, which is a schematic diagram of a communication system 30 according to an embodiment of the present invention. Different to the communication system 10, the communication system 30 includes a user equipment (UE), a radio unit (RU), a baseband unit (BBU), a user-plane program, a 5G core (5GC) network and an application (APP) server. The BBU includes a distribution unit (DU), a central unit (CU) and a Linux kernel framework Netfilter. The distribution unit DU is configured to receive an application packet from the UE and to receive the application packet from the CU The central unit CU is configured to receive the application packet from the DU and to receive a GTP encapsulated application packet from a user plane function (UPF) of the 5GC network. The Linux kernel framework Netfilter is configured to receive the GTP encapsulated application packet from the CU. In an example, the Linux kernel framework Netfilter is a framework in Linux network kernel, which may be a firewall for filtering out the application packets with specific rules and pushing the filtered application packets into a Linux kernel framework Netfilter queue. In an embodiment, the specific rule may be whether the packet length of an application packet is shorter than or equal to a specific value or not, i.e. the packet length will be the length of TCP three-way handshake packet which is short, such that the user-plane application is not required to process too many packets and affect the throughput. In detail, the packet length conforming to the TCP three-way handshake packet includes the GTP/ UDP header, and the packet is transmitted to the Netfilter queue according to the specific rule. Practically, the packet for data transmission only passes through the Netfilter and is not transmitted to the Netfilter queue. For example, the packet for the data transmission is around 1400-1500 bytes, and the packet length of the TCP three-way handshake packet is around 100 bytes, thus, the packet length is the length of TCP three-way handshake packet. That is, the packet length of the TCP three-way handshake packet is shorter than the packet length for the data transmission. The user-plane application may be a software implemented on the BBU to modify the content of the TCP three-way handshake packets in the Linux kernel framework Netfilter queue.

More specifically, the user-plane application pulls the application packet from the Linux kernel framework Netfilter queue and checks if the application packet is a GTP packet or not; if yes, i.e. the application packet is a GTP packet, the user-plane application checks whether the inner application packet is a TCP three-way handshake packet or not.

When the inner application packet is determined as a TCP three-way handshake packet, the user-plane application decapsulates the GTP header and modifies the MSS value to avoid IP fragmentation problem.

As shown in FIG. 3, the UE sends out the TCP three-way handshake ([SYN] packet or [SYN,ACK] packet) packet to App Server with the MSS value of 1460 bytes. When the application packet is sent out from the central unit CU, the application packet is encapsulated with the GTP header, the UDP header and the IP header. The encapsulated packet is pushed into the Linux kernel framework Netfilter queue when passing through the Linux kernel framework Netfilter. Then, the user-plane program pulls the encapsulated packet from the Linux kernel framework Netfilter queue, decapsulates the GTP header and modifies the MSS value of the inner TCP three-way handshake packet to 1100 and recalculates for the TCP checksum.

After the modification, the modified MSS value is 1100 bytes and the modified GTP encapsulated is pushed back to the Linux kernel framework Netfilter queue and sent to the UPF of the 5GC network. The UPF decapsulates the application packet with the modified GTP header and sends it to the APP Server. In this situation, the TCP payload size of the application packet received by the UE is shorter than 1100 bytes during the TCP connection, since the MSS value of the TCP three-way handshake packet is modified as 1100 bytes and the APP Server takes 1100 bytes as its MSS value. As such, the IP fragmentation/defragmentation problem is avoided.

Figure 4:
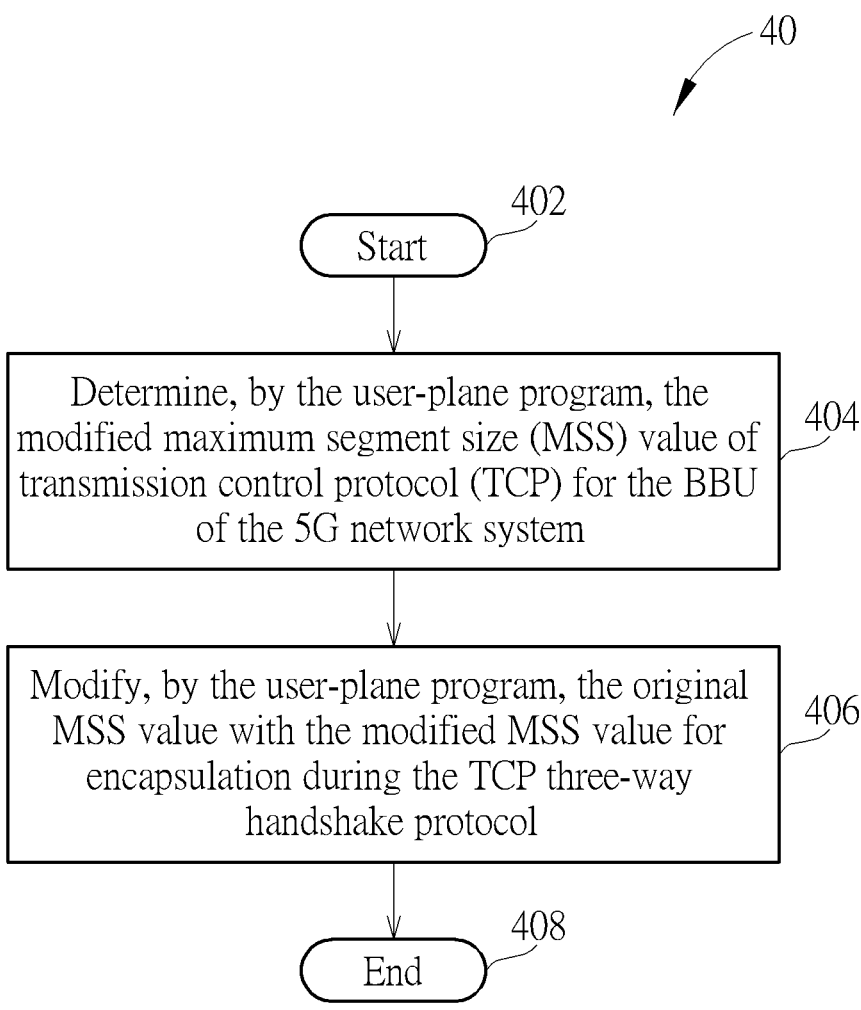
FIG. 4 is a schematic diagram of a transmission method according to an embodiment of the present invention.

An operation of adjusting the TCP MSS value of the TCP three-way handshake packet may be summarized as a transmission method 40 for the 5G network system, as shown in FIG. 4. The transmission method 40 includes the following steps:

Step 402: Start.

Step 404: Determine, by the user-plane program, the modified maximum segment size (MSS) value of transmission control protocol (TCP) for the BBU of the 5G network system.

Step 406: Modify, by the user-plane program, the original MSS value with the modified MSS value for encapsulation during the TCP three-way handshake protocol.

Step 408: End.

Please refer to the embodiments of the communication system 10 mentioned above for the operation process of the transmission method 40, which is not narrated herein for brevity.

It should be noted that, although the above embodiments are provided to illustrate the concept of the present invention, those skilled in the art may make modifications to the present invention based on different requirements, which are not limited thereto. For example, the MSS value may be modified according to requirements of a user or the computer system. These modifications are not limited thereto, and also belong to the scope of the present invention.

In summary, the present invention provides a transmission method and baseband unit for a 5G network system to solve IP fragmentation/defragmentation problem and improve system throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission method for a baseband unit (BBU) of a 5G network system, comprising:

receiving, by a Linux kernel framework Netfilter within the BBU, an application packet;

determining, by a user-plane program, a modified maximum segment size (MSS) value of transmission control protocol (TCP) connection for the BBU of the 5G network system;

modifying, by the user-plane program, an original MSS value with the modified MSS value for encapsulation during a TCP three-way handshake procedure; and pulling, by the user-plane program, the application packet from a Linux kernel framework Netfilter queue;

wherein the modified MSS value is related to a packet length of the application packet between a user equipment (UE) and an application (APP) server of the 5G network system.

2. The transmission method of claim 1, further comprising:

decapsulating, by the user-plane program, a General Packet Radio Service (GPRS) Tunneling Protocol (GTP) header of the application packet;

determining, by the user-plane program, a checksum of the TCP header; and encapsulating, by the user-plane program, the GTP header with modified MSS value and the checksum of the TCP header.

3. The transmission method of claim 2, further comprising:

modifying, by the user-plane program, the MSS value in the BBU.

4. The transmission method of claim 1, further comprising:

decapsulating, by a User Plane Function (UPF) of the 5G network system, the GTP header with modified MSS value and the checksum of the TCP header to an application (APP) server.

5. The transmission method of claim 1, wherein the application packet of a TCP three-way handshake packet, and the application packet is sent from a user equipment (UE) to an application (APP) server.

6. A baseband unit (BBU) for a 5G network system, wherein the 5G network system includes a user equipment (UE) and an application (APP) server, and the BBU comprising:

a processor;

a distribution unit (DU), implemented by the processor;

a central unit (CU), implemented by the processor;

a Linux kernel framework Netfilter, configured to receive an application packet from the UE or the APP server; and a user-plane program, configured to receive the application packet from the Linux kernel framework Netfilter to determine a modified maximum segment size (MSS) value of transmission control protocol (TCP) for the BBU, and to modify an original MSS value with the modified MSS value for encapsulation during a TCP three-way handshake protocol;

wherein the modified MSS value is related to a packet length of the application packet between the UE and the APP server of the 5G network system;

wherein the user-plane program is configured to pull the application packet from a Linux kernel framework Netfilter queue.

7. The BBU of claim 6, wherein the user-plane program is configured to decapsulate a General Packet Radio Service (GPRS) Tunneling Protocol (GTP) header of the application packet, to determine a checksum of the TCP header, and to encapsulate the GTP header with modified MSS value and the checksum of the TCP header.

8. The BBU of claim 7, wherein the user-plane program is configured to modify the MSS value in the BBU.

9. The BBU of claim 6, wherein a User Plane Function (UPF) of the 5G network system is configured to decapsulate the GTP header with modified MSS value to an application (APP) server.

10. The BBU of claim 6, wherein the application packet of a TCP three-way handshake packet, and the application packet is sent from the user equipment (UE) to an application (APP) server.

* * * * *